(12) United States Patent
Yang et al.

(10) Patent No.: US 10,382,562 B2
(45) Date of Patent: Aug. 13, 2019

(54) VERIFICATION OF SERVER CERTIFICATES USING HASH CODES

(71) Applicant: A10 Networks, Inc., San Jose, CA (US)

(72) Inventors: Yang Yang, San Jose, CA (US); Xuyang Jiang, Saratoga, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 370 days.

(21) Appl. No.: 15/344,443

(22) Filed: Nov. 4, 2016

(65) Prior Publication Data

US 2018/0131521 A1  May 10, 2018

(51) Int. Cl.
*H04L 29/08* (2006.01)
*H04L 9/32* (2006.01)
*H04L 29/06* (2006.01)

(52) U.S. Cl.
CPC .......... *H04L 67/141* (2013.01); *H04L 9/3236* (2013.01); *H04L 9/3265* (2013.01); *H04L 63/0272* (2013.01); *H04L 63/045* (2013.01); *H04L 63/0823* (2013.01); *H04L 63/12* (2013.01); *H04L 63/166* (2013.01); *H04L 2209/38* (2013.01)

(58) Field of Classification Search
CPC ... H04L 9/3239; H04L 65/1069; H04L 67/02; H04L 9/3263; H04L 9/0643; H04L 9/304
USPC .......................................................... 713/156
See application file for complete search history.

(56) References Cited

U.S. PATENT DOCUMENTS

| 4,001,819 A | 1/1977 | Wise |
| 5,101,402 A | 3/1992 | Chiu et al. |
| 5,163,088 A | 11/1992 | LoCascio |

(Continued)

FOREIGN PATENT DOCUMENTS

| CN | 1422468 A | 6/2003 |
| CN | 104106241 A | 10/2014 |

(Continued)

OTHER PUBLICATIONS

"How to Create a Rule in Outlook 2003" CreateaRule-Outlook2003. doc 031405 mad, 3 pages.

(Continued)

*Primary Examiner* — Mohammed Waliullah
(74) *Attorney, Agent, or Firm* — Keith Kline; The Kline Law Firm PC

(57) ABSTRACT

Described are systems and methods for verifying server security certificates using hash codes. The system may include a client secure socket layer (SSL) node, a service gateway node, and a storage node. The client SSL node may receive a session request from a client. The service gateway node may forward the session request to a server to receive a server security certificate. The service gateway node may query a server domain name system module to receive a hash code. The hash code may include a first hash value and a hash function to obtain the server security certificate based on the first hash value. The service gateway node may calculate a second hash value by applying the hash function to the server security certificate and match the second hash value and the first hash value to determine whether the server security certificate is valid.

20 Claims, 9 Drawing Sheets

(56) References Cited

U.S. PATENT DOCUMENTS

| | | | |
|---|---|---|---|
| 5,359,659 | A | 10/1994 | Rosenthal |
| 5,414,833 | A | 5/1995 | Hershey et al. |
| 5,684,875 | A | 11/1997 | Ellenberger |
| 5,940,002 | A | 8/1999 | Finn et al. |
| 5,960,177 | A | 9/1999 | Tanno |
| 6,088,804 | A | 7/2000 | Hill et al. |
| 6,104,716 | A * | 8/2000 | Crichton ............ H04L 63/0281 370/401 |
| 6,105,137 | A * | 8/2000 | Graunke ................ G06F 21/64 713/175 |
| 6,119,236 | A | 9/2000 | Shipley |
| 6,205,115 | B1 | 3/2001 | Ikebe et al. |
| 6,237,036 | B1 | 5/2001 | Ueno et al. |
| 6,304,975 | B1 | 10/2001 | Shipley |
| 6,324,286 | B1 | 11/2001 | Lai et al. |
| 6,449,651 | B1 | 9/2002 | Dorfman et al. |
| 6,519,703 | B1 | 2/2003 | Joyce |
| 6,594,780 | B1 | 7/2003 | Shen et al. |
| 6,715,081 | B1 | 3/2004 | Attwood et al. |
| 6,732,279 | B2 | 5/2004 | Hoffman |
| 6,735,702 | B1 | 5/2004 | Yavatkar et al. |
| 6,754,832 | B1 | 6/2004 | Godwin et al. |
| 6,757,822 | B1 | 6/2004 | Feiertag et al. |
| 6,779,117 | B1 | 8/2004 | Wells |
| 6,988,106 | B2 | 1/2006 | Enderwick et al. |
| 7,159,237 | B2 | 1/2007 | Schneier et al. |
| 7,194,766 | B2 | 3/2007 | Noehring et al. |
| 7,197,637 | B2 * | 3/2007 | Schmidt ................ B60R 25/24 713/156 |
| 7,222,366 | B2 | 5/2007 | Bruton, III et al. |
| 7,280,999 | B2 * | 10/2007 | Chung ............ H04L 29/12132 |
| 7,296,283 | B2 | 11/2007 | Hrastar et al. |
| 7,392,241 | B2 | 6/2008 | Lin et al. |
| 7,418,733 | B2 | 8/2008 | Connary et al. |
| 7,430,755 | B1 * | 9/2008 | Hughes ............... H04L 63/0823 726/3 |
| 7,543,052 | B1 | 6/2009 | Cesa Klein |
| 7,565,549 | B2 | 7/2009 | Satterlee et al. |
| 7,577,833 | B2 | 8/2009 | Lai |
| 7,624,264 | B2 * | 11/2009 | Aura ...................... H04L 9/3236 380/223 |
| 7,640,591 | B1 | 12/2009 | Tripathi et al. |
| 7,653,633 | B2 | 1/2010 | Villella et al. |
| 7,665,138 | B2 | 2/2010 | Song et al. |
| 7,739,736 | B1 | 6/2010 | Tripathi et al. |
| 7,809,131 | B1 | 10/2010 | Njemanze et al. |
| 7,895,649 | B1 | 2/2011 | Brook et al. |
| 8,037,532 | B2 | 10/2011 | Haswell |
| 8,171,019 | B2 * | 5/2012 | Balogh ................... G06F 9/505 770/722 |
| 8,220,056 | B2 | 7/2012 | Owens, Jr. |
| 8,239,670 | B1 | 8/2012 | Kaufman et al. |
| 8,289,981 | B1 | 10/2012 | Wei et al. |
| 8,301,802 | B2 | 10/2012 | Wei et al. |
| 8,307,203 | B2 * | 11/2012 | Fraleigh ............. H04L 63/0823 713/156 |
| 8,332,464 | B2 * | 12/2012 | Dispensa .......... H04L 29/12009 709/203 |
| 8,448,245 | B2 | 5/2013 | Banerjee et al. |
| 8,478,708 | B1 | 7/2013 | Larcom |
| 8,478,986 | B2 * | 7/2013 | Merugu .............. H04L 63/0281 713/153 |
| 8,595,845 | B2 | 11/2013 | Basavapatna et al. |
| 8,700,892 | B2 * | 4/2014 | Bollay ................. H04L 63/166 713/153 |
| 8,707,043 | B2 * | 4/2014 | Wason ................. H04L 9/3273 380/229 |
| 8,762,569 | B1 * | 6/2014 | Ly ........................... H04L 69/16 709/238 |
| 8,782,393 | B1 * | 7/2014 | Rothstein ............ H04L 63/166 705/75 |
| 8,800,034 | B2 | 8/2014 | McHugh et al. |
| 8,806,011 | B1 | 8/2014 | Graham-Cumming |
| 8,813,228 | B2 | 8/2014 | Magee et al. |
| 8,832,832 | B1 | 9/2014 | Visbal |
| 9,077,709 | B1 * | 7/2015 | Dall ..................... H04L 63/0823 |
| 9,215,208 | B2 | 12/2015 | Fraize et al. |
| 9,276,902 | B2 * | 3/2016 | Treuhaft ........... H04L 29/12066 |
| 9,742,806 | B1 * | 8/2017 | Rothstein .............. H04L 63/166 |
| 9,780,952 | B1 * | 10/2017 | Behm .................. H04L 9/3247 |
| 2001/0042204 | A1 | 11/2001 | Blaker et al. |
| 2002/0087708 | A1 | 7/2002 | Low et al. |
| 2002/0157019 | A1 * | 10/2002 | Kadyk ................. H04L 63/0281 726/4 |
| 2002/0188839 | A1 | 12/2002 | Noehring et al. |
| 2003/0023846 | A1 | 1/2003 | Krishna et al. |
| 2003/0028585 | A1 | 2/2003 | Yeager et al. |
| 2003/0061507 | A1 | 3/2003 | Xiong et al. |
| 2003/0069973 | A1 | 4/2003 | Ganesan et al. |
| 2003/0135625 | A1 | 7/2003 | Fontes et al. |
| 2003/0187688 | A1 | 10/2003 | Fey et al. |
| 2003/0196081 | A1 | 10/2003 | Savarda et al. |
| 2003/0200456 | A1 | 10/2003 | Cyr et al. |
| 2004/0008711 | A1 | 1/2004 | Lahti et al. |
| 2004/0054807 | A1 | 3/2004 | Harvey et al. |
| 2004/0059943 | A1 | 3/2004 | Marquet et al. |
| 2004/0059951 | A1 | 3/2004 | Pinkas et al. |
| 2004/0059952 | A1 | 3/2004 | Newport et al. |
| 2004/0093524 | A1 | 5/2004 | Sakai |
| 2004/0111635 | A1 | 6/2004 | Boivie et al. |
| 2004/0143751 | A1 | 7/2004 | Peikari |
| 2004/0242200 | A1 | 12/2004 | Maeoka et al. |
| 2005/0021999 | A1 | 1/2005 | Touitou et al. |
| 2005/0036501 | A1 | 2/2005 | Chung et al. |
| 2005/0041584 | A1 | 2/2005 | Lau et al. |
| 2005/0044068 | A1 | 2/2005 | Lin et al. |
| 2005/0044270 | A1 | 2/2005 | Grove et al. |
| 2005/0108434 | A1 | 5/2005 | Witchey |
| 2005/0182946 | A1 * | 8/2005 | Shatford .............. H04L 9/0643 713/185 |
| 2005/0210243 | A1 | 9/2005 | Archard et al. |
| 2005/0257093 | A1 | 11/2005 | Johnson et al. |
| 2006/0056297 | A1 | 3/2006 | Bryson et al. |
| 2006/0061507 | A1 | 3/2006 | Mohamadi |
| 2006/0143702 | A1 * | 6/2006 | Hisada ................ H04L 12/4641 726/15 |
| 2006/0143707 | A1 | 6/2006 | Song et al. |
| 2006/0206936 | A1 | 9/2006 | Liang et al. |
| 2006/0212522 | A1 | 9/2006 | Walter et al. |
| 2006/0251057 | A1 | 11/2006 | Kwon et al. |
| 2006/0253902 | A1 | 11/2006 | Rabadan et al. |
| 2006/0256716 | A1 | 11/2006 | Caci |
| 2006/0265585 | A1 | 11/2006 | Lai |
| 2006/0288411 | A1 | 12/2006 | Garg et al. |
| 2007/0056038 | A1 | 3/2007 | Lok |
| 2007/0073660 | A1 | 3/2007 | Quinlan |
| 2007/0204003 | A1 * | 8/2007 | Abramson ............. H04L 67/06 709/217 |
| 2007/0291773 | A1 | 12/2007 | Khan et al. |
| 2008/0183885 | A1 | 7/2008 | Durrey et al. |
| 2008/0229418 | A1 | 9/2008 | Chen et al. |
| 2008/0256623 | A1 | 10/2008 | Worley et al. |
| 2009/0049198 | A1 | 2/2009 | Blinn et al. |
| 2009/0070470 | A1 | 3/2009 | Bauman et al. |
| 2009/0150996 | A1 | 6/2009 | Haswell |
| 2009/0168995 | A1 | 7/2009 | Banga et al. |
| 2009/0227228 | A1 | 9/2009 | Hu et al. |
| 2009/0241190 | A1 | 9/2009 | Todd et al. |
| 2009/0287941 | A1 | 11/2009 | Shouno |
| 2010/0106833 | A1 | 4/2010 | Banerjee et al. |
| 2010/0284300 | A1 | 11/2010 | Deshpande et al. |
| 2010/0286998 | A1 | 11/2010 | Picken |
| 2011/0026537 | A1 | 2/2011 | Kolhi et al. |
| 2011/0029599 | A1 | 2/2011 | Pulleyn et al. |
| 2011/0082947 | A1 | 4/2011 | Szeto et al. |
| 2011/0093785 | A1 | 4/2011 | Lee et al. |
| 2011/0131646 | A1 | 6/2011 | Park et al. |
| 2011/0153744 | A1 | 6/2011 | Brown |
| 2011/0183748 | A1 * | 7/2011 | Wilson .................... G07F 17/32 463/25 |
| 2011/0249572 | A1 | 10/2011 | Singhal et al. |
| 2012/0036272 | A1 | 2/2012 | El Zur |
| 2012/0042060 | A1 | 2/2012 | Jackowski et al. |

(56) References Cited

U.S. PATENT DOCUMENTS

| | | |
|---|---|---|
| 2012/0110472 A1 | 5/2012 | Amrhein et al. |
| 2012/0117646 A1 | 5/2012 | Yoon et al. |
| 2012/0163186 A1 | 6/2012 | Wei et al. |
| 2012/0174196 A1 | 7/2012 | Bhogavilli et al. |
| 2012/0226582 A1 | 9/2012 | Hammad |
| 2013/0019025 A1 | 1/2013 | Chaturvedi et al. |
| 2013/0124713 A1 | 5/2013 | Feinberg et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0212265 A1 | 8/2013 | Rubio Vidales et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0258536 A1 | 9/2014 | Chiong |
| 2014/0269308 A1 | 9/2014 | Oshiba |
| 2014/0280832 A1 | 9/2014 | Oshiba |
| 2014/0283065 A1 | 9/2014 | Teddy et al. |
| 2014/0298091 A1 | 10/2014 | Carlen et al. |
| 2014/0310396 A1 | 10/2014 | Christodorescu et al. |
| 2014/0325588 A1 | 10/2014 | Jalan et al. |
| 2015/0033341 A1 | 1/2015 | Schmidtler et al. |
| 2015/0088597 A1 | 3/2015 | Doherty et al. |
| 2015/0312268 A1 | 10/2015 | Ray |
| 2015/0333988 A1 | 11/2015 | Jalan et al. |
| 2016/0277372 A1* | 9/2016 | Shah .................... H04L 63/061 |
| 2017/0118197 A1* | 4/2017 | Murthy .................. G06F 21/44 |
| 2017/0338951 A1* | 11/2017 | Fu ........................ H04L 9/0852 |
| 2017/0374062 A1* | 12/2017 | Brady ................ H04L 63/1408 |

FOREIGN PATENT DOCUMENTS

| | | |
|---|---|---|
| HK | 1198848 A | 6/2015 |
| TW | 375721 | 12/1999 |
| TW | 477140 B | 2/2004 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

OTHER PUBLICATIONS

"Oracle Intelligent Agent User's Guide," Oracle Corporation, Release 9.2.0, Part No. A96676-01, Mar. 2002, 36 pages.

"SOL11243: iRules containing the RULE_INIT iRule event do not re-initialize when a syntax error is corrected," F5 Networks, Inc., f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

* cited by examiner

VERIFICATION OF SERVER CERTIFICATES USING HASH CODES

TECHNICAL FIELD

This invention relates generally to data networks and more particularly to verification of server certificates using hash codes.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Security is an important aspect of network communications. User terminals used by an end user to access services provided over a network often communicate to servers over secure communication sessions. The secure communication sessions may be encrypted by using server security certificates, particularly genuine security certificates issued and signed by certification authorities (CA). However, despite the user terminal receiving a properly signed server security certificate, there is often no indication that the server security certificate received from the server is directly related to the server with which the user terminal is attempting to communicate. Conventionally, a private network associated with the user terminal may have a network device, such as a router or a switch, responsible for intercepting the server security certificate and providing the server security certificate via the secure communication session to the user terminal, as if the user terminal received the server security certificate from the server. However, although the network device may intercept the secure communication session between the user terminal and the server to check the validity of the server security certificate, the network device cannot validate the direct relationship between the server security certificate and the server through a means other than the secure communication session.

Furthermore, in a private data network of an organization, such as a company network or a government network, the organization may have corporate security policies to guard against fraud, theft, and privacy and to comply with applicable regulations and laws. The organization may deploy a network security gateway to intercept communication sessions between internal computing devices and untrusted external computing devices. The network security gateway can inspect the communication sessions to ensure that predetermined organization security policies are followed. In such a scenario, it is possible to replace a server security certificate by a server security certificate generated by the network security gateway. However, as such security inspection is legitimate in the private data network of the organization, the network security gateway may need to assure the internal computing device that the replaced server security certificate is also legitimate.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure relates to systems and methods for verification of server security certificates using hash codes. According to one of the approaches of the present disclosure, a system for verifying a server security certificate using a hash code is provided. The system may include a client secure socket layer (SSL) node, a service gateway node in communication with the client SSL node, and a storage node. The client SSL node may be operable to receive, from a client, a session request to establish an SSL communication session with the server. The session request may include at least a server address. The client SSL node may be operable to forward the session request to the service gateway node. The service gateway node may be operable to send the session request to the server using the server address. The service gateway node may be further operable to receive, in response to the session request, the server security certificate from the server. The service gateway node may be further operable to query a server domain name system (DNS) module associated with the server to receive the hash code associated with the server. The querying may include sending at least the server address to the server DNS module. The service gateway node may be operable to receive, in response to the querying, the hash code associated with the server from the server DNS module. The hash code may include at least a first hash value associated with the server and a hash function to be applied to the first hash value to obtain the server security certificate. The service gateway node may be operable to calculate a second hash value associated with the server. The calculation may be performed by applying the hash function to the server security certificate. The service gateway node may be further operable to match the first hash value associated with the server and the second hash value associated with the server. Furthermore, the service gateway node may determine, based on the matching, whether the server security certificate is valid. The client SSL may be further operable to establish the SSL communication session between the client and the server based on determining that the server security certificate is valid. The storage node may be operable to store at least the server security certificate and the hash code associated with the server.

According to another approach of the present disclosure, a method for verifying a server security certificate using a hash code is provided. The method may commence with receiving, by a client SSL node, from a client, a session request to establish an SSL communication session with the server. The session request may include at least a server address. The method may continue with forwarding, by the client SSL node, the session request to a service gateway node. The method may further include sending, by the service gateway node, the session request to the server based on the server address. The service gateway node may receive, in response to the session request, the server security certificate from the server. The method may continue with querying, by the service gateway node, a server DNS module associated with the server to receive the hash code associated with the server. The querying may include sending at least the server address to the server DNS module. The service gateway node may receive, in response to the querying, the hash code associated with the server from the server DNS module. The hash code may include at least a first hash value associated with the server and a hash function to be applied to the first hash value to obtain the server security certificate. The method may continue with calculating, by the service gateway node, a second hash value associated with the server. The calculating may be performed by applying the hash function to the server security certificate. The method may further include matching, by the service gateway node, the first hash value associated with the server and the second hash value associated with the server. The service gateway node may determine, based on the matching, whether the server security certificate is valid. The method may continue with establishing, by the client SSL node, the SSL communication session between the client and the server. The SSL communication session between the client and the server may be established based on the determination that the server security certificate is valid.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
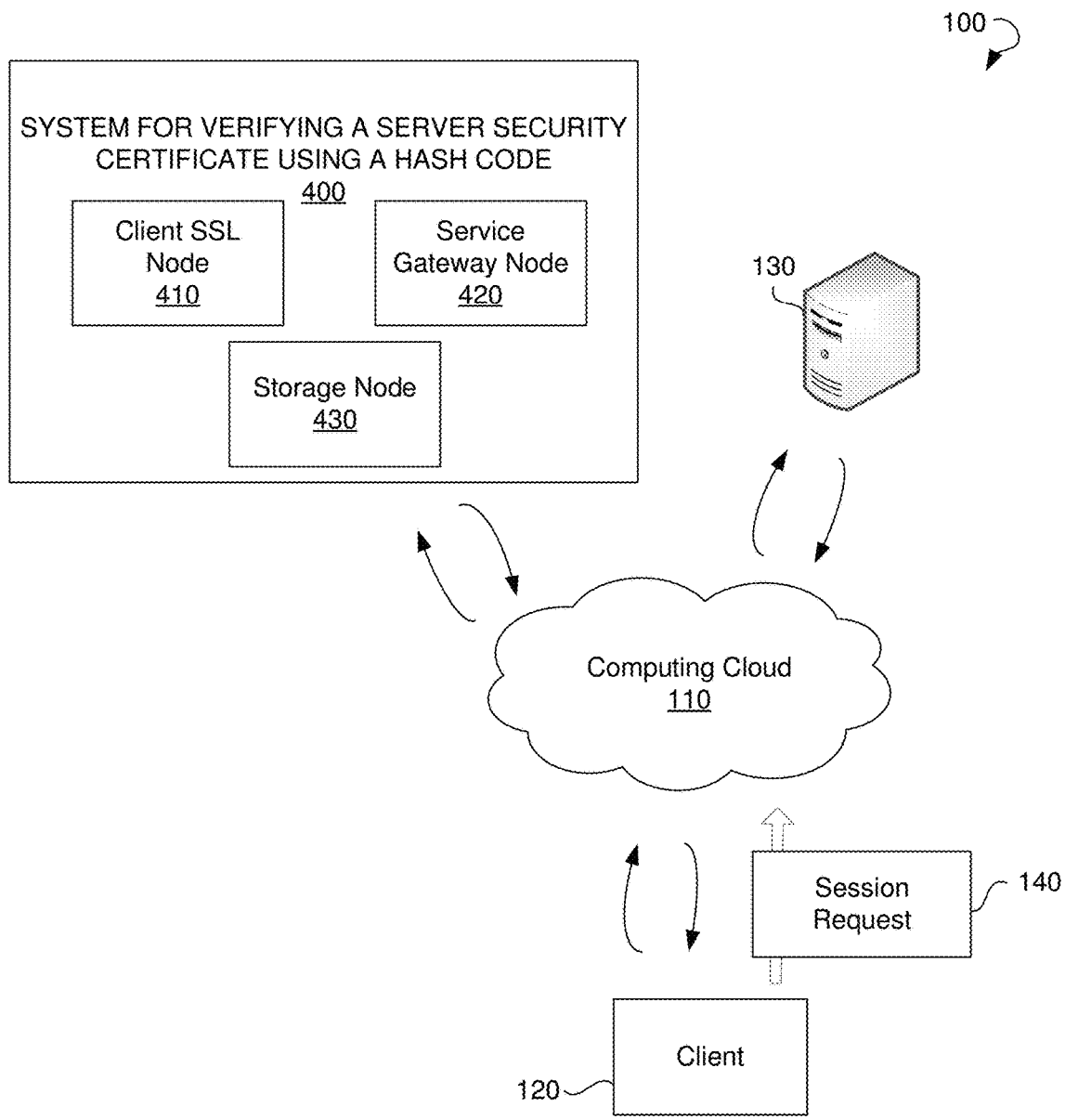
FIG. 1 shows an environment, within which methods and systems for verifying a server security certificate using a hash code can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

As outlined in the summary, the embodiments of the present disclosure are directed to verifying server security certificates using hash codes. A system for verifying server security certificates using hash codes may be responsible for determining whether a server security certificate received from a server during an SSL communication session between a client and the server is directly related to the server. The SSL communication session is a network communication session performed using an SSL. The SSL is a cryptographic protocol designed for providing communication security over the Internet. The SSL may be widely used for instant messaging and Voice over Internet Protocol (VoIP), and in applications such as browsing, e-mail, Internet faxing, and so forth.

A network node, such as a service gateway node or an SSL node, may be present in a private data network of the client. The network node may intercept data traffic associated with the SSL communication session between the client and the server. More specifically, the network node may intercept a session request sent by the client to the server to establish the SSL communication session with the server. Based on a server address present in the session request, the network node may send the session request to the server. The server may respond to the session request by sending a server security certificate to the network node.

Upon receipt of the server security certificate, the network node may send a request to a server DNS module to receive a hash code associated with the server. The server DNS module may respond to the network node by sending the hash code of the server. The hash code may include a first hash value associated with the server and a hash function to be applied to the first hash value to obtain the server security certificate. Upon receipt of the hash code, the network node may apply the hash function present in the hash code to the server security certificate to receive a second hash value associated with the server. If the first hash value, which is present in the hash code received from the server DNS module, and the second hash value, which is calculated by applying the hash function present in the hash code to the server security certificate, match, and the network node may determine that the server security certificate is valid. Based on the determination that the server security certificate is valid, the network node may establish the SSL communication session between the client and the server. If the first hash value and the second hash value do not match, the network node may terminate the SSL communication session with the server.

Referring now to the drawings, FIG. 1 illustrates an environment 100 within which methods and systems for verifying a server security certificate using a hash code can be implemented. The environment 100 may include a data network, such as a computing cloud 110, a client 120, a server 130, and a system 400 for verifying a server security certificate using a hash code, also referred to as a system 400. The client 120 may include a network machine or a network resource that sends a session request 140 for initiating a secure communication session with the server 130. The client 120 may communicate with the server 130 using the computing cloud 110.

The data network may be not limited to a computing cloud 110 but may include the Internet or any other network capable of communicating data between devices. Suitable networks may include or interface with any one or more of, for instance, a local intranet, a Personal Area Network, a Local Area Network (LAN), a Wide Area Network, a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that are interconnected for the purpose of data communication.

The system 400 may include a client SSL node 410, a service gateway node 420, and a storage node 430 in communication with the client SSL node 410 and the service gateway node 420. The client SSL node 410 and the service gateway node 420 may be located in the path between the client 120 and server 130 and may be configured to intercept the session request 140. Upon receiving the session request 140, the system 400 may establish a secure communication session with the server 130. The system 400 may be responsible for intercepting a server security certificate sent by the server 130 in response to the session request 140 and validating the server security certificate using a hash value associated with the server. Validation of the server security certificate is described in detail with reference to FIGS. 2-8.

Figure 2:
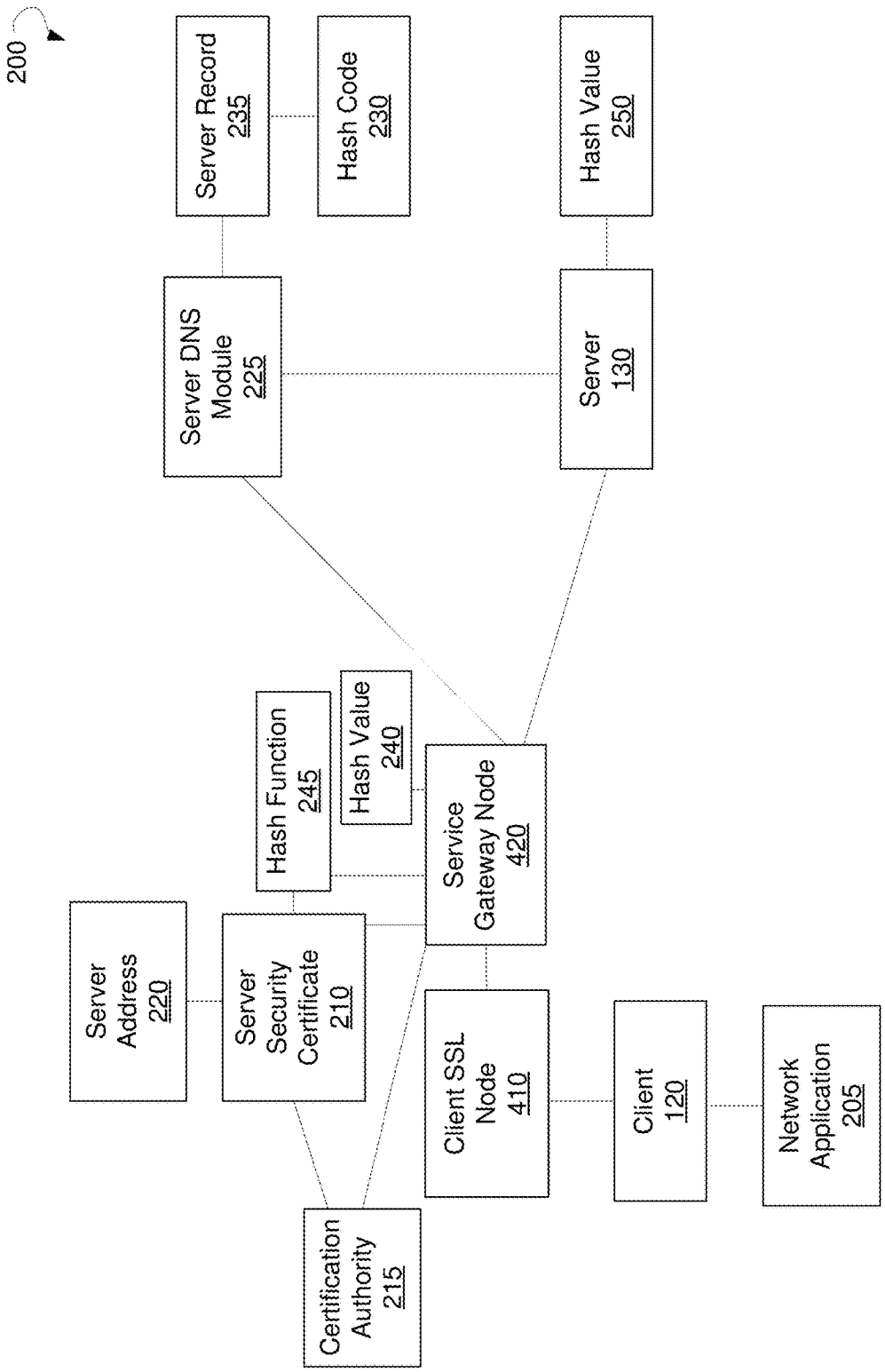
FIG. 2 is a block diagram showing a communication between a client and a server via a system for verifying a server security certificate using a hash code.

FIG. 2 is a block diagram 200 showing a communication between a client and a server via a system for verifying a server security certificate using a hash code, according to an example embodiment. A client 120, such as a smartphone, a laptop, a personal computer (PC), a router, a switch, and the like, may have an access to a data network (not shown). Data traffic between the client 120 and a server 130 in the data network may be intercepted using a client SSL node 410 and a service gateway node 420 of the system 400 shown in FIG. 1 for verifying a server security certificate using a hash code. A network application 205 may be running on the client 120 to provide the access to the data network. The client SSL node 410 may receive a session request from the client 120 and determine that the session request is a request to establish an SSL communication session with the server 130. Upon determining that the SSL communication session is requested to be established by the client 120, the client SSL node 410 may forward the session request to the service gateway node 420. The service gateway node 420 may send the session request to the server 130. In response to the session request, the server 130 may send a server security certificate 210. The service gateway node 420 may receive the server security certificate 210 and determine that the server security certificate 210 is signed by a certification authority 215. The service gateway node 420 may retrieve server-related data from the server security certificate 210. The server-related data may include a server address 220 related to a server DNS module 225 associated with the server 130. Based on the server address, the service gateway node 420 may query the server DNS module 225 to receive a hash code 230 associated with the server 130. More specifically, based on a query received from the service gateway node 420, the server DNS module 225 may access a server record 235. The server record 235 may be associated with the server 130 and may store the hash code 230. The server DNS module 225 may send the hash code 230 to the service gateway node 420. The service gateway node 420 may receive the hash code 230 from the server DNS module 225. The hash code 230 stored by the server DNS module 225 for the server 130 may include a hash value 240 and a hash function 245. The hash value 240 may be associated with the server 130. The hash function 245 may include a function to be applied to the hash value 240 to obtain the server security certificate associated with the server 130. To determine whether the server security certificate 210 provided by the server is a valid server security certificate, the service gateway node 420 may apply the hash function 245 to the server security certificate 210. Upon applying the hash function 245, the service gateway node 420 may obtain the hash value 250. The service gateway node 420 may compare the hash value 240 received in the hash code 230 from the server DNS module 225 and the hash value 250 obtained based on applying the hash function 245 to the server security certificate 210. If the hash value 250 and the hash value 240 match, the service gateway node 420 may determine that the server security certificate 210 is valid.

Figure 3:
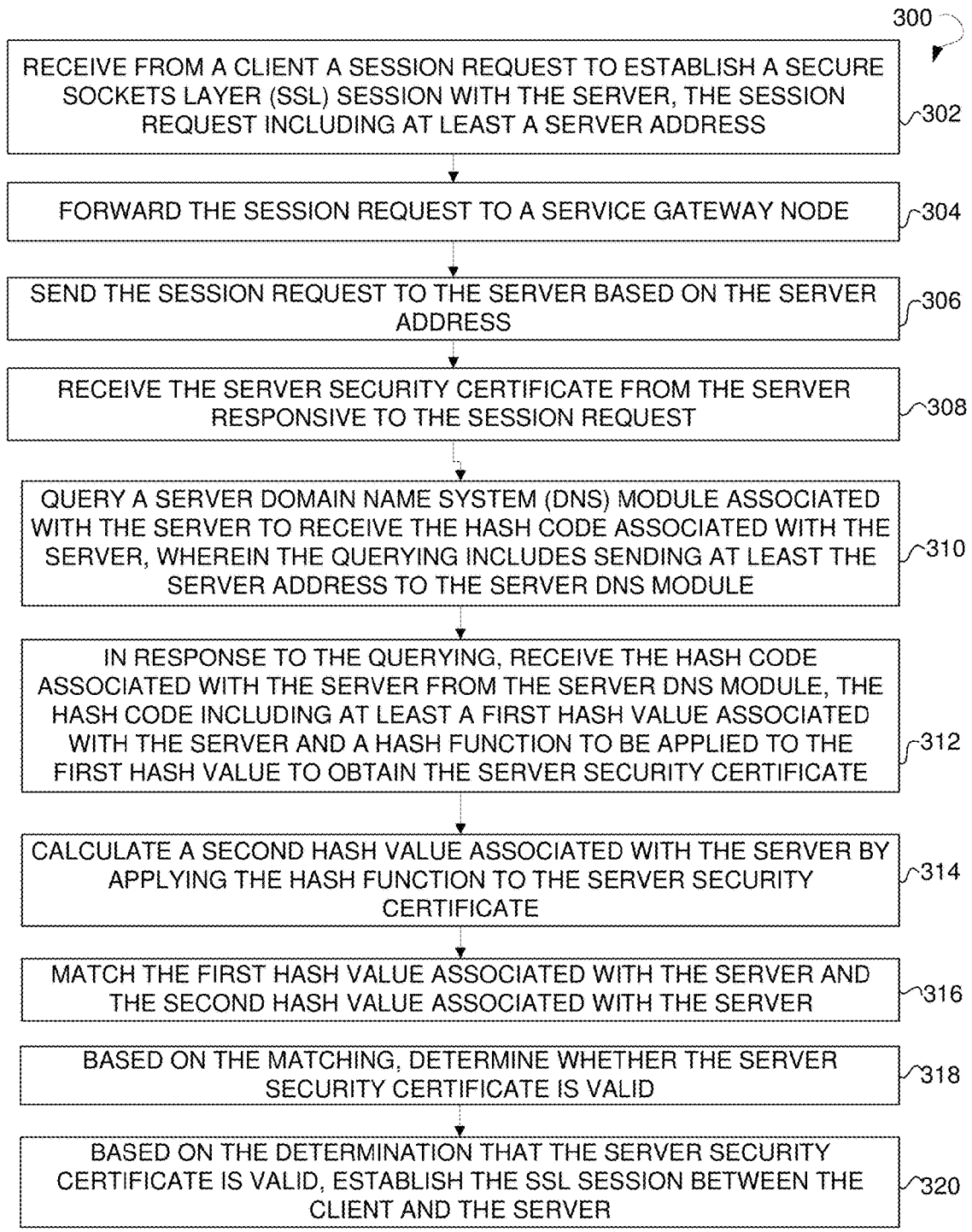
FIG. 3 is a flow diagram illustrating a method for validating a server security certificate using a hash code.

FIG. 3 shows a process flow diagram of a method 300 for verifying a server security certificate using a hash code, according to an example embodiment. In some embodiments, the operations may be combined, performed in parallel, or performed in a different order. The method 300 may also include additional or fewer operations than those illustrated. The method 300 may be performed by processing logic that may include hardware (e.g., decision making logic, dedicated logic, programmable logic, and microcode), software (such as software run on a general-purpose computer system or a dedicated machine), or a combination of both.

The method 300 may commence with receiving, by a client SSL node, from a client, a session request to establish an SSL communication session with the server at operation 302. In an example embodiment, the client may include a plurality of modules including at least a network application, an SSL module, a client DNS module, and so forth. The session request may include at least a server address. In an example embodiment, the SSL communication session may include a secure session selected from a group including: a Hypertext Transfer Protocol (HTTP) session, a file transfer session, a remote access session, a File Transfer Protocol (FTP) session, a VoIP session, a Session Initiation Protocol (SIP) session, a video streaming session, an audio streaming session, an e-commerce session, an enterprise application session, an email session, an online gaming session, a teleconference session, a web-based communication session, and so forth.

The method 300 may continue with forwarding, by the client SSL node, the session request to a service gateway node at operation 304. The method 300 may further include sending, by the service gateway node, the session request to the server at operation 306. The session request may be sent to the server based on the server address contained in the session request.

The method 300 may continue with receiving, by the service gateway node, in response to sending of the session request, the server security certificate from the server at operation 308. The method 300 may continue with operation 310 of querying, by the service gateway node, a server DNS module associated with the server to receive the hash code associated with the server. The querying may include sending at least the server address to the server DNS module.

The method 300 may further include operation 312, at which the service gateway node may receive, in response to the querying, the hash code associated with the server from the server DNS module. In an example embodiment, the hash code may be selected from a group including: an integer, a hexa-decimal number, a string of characters, and so forth. The hash code may include at least a first hash value associated with the server and a hash function to be applied to the first hash value to obtain the server security certificate. In one example embodiment, the hash function may be selected from a group including: a Message Digest 5 (MD5) algorithm, a 16-bit cyclic redundancy check (CRC), a 32-bit CRC, a 64-bit CRC, a Secure Hash Algorithm (SHA) Version 1, a SHA Version 2, SHA-512, and so forth.

The method 300 may continue with calculating, by the service gateway node, a second hash value associated with the server at operation 314. The calculation may be performed by applying the hash function to the server security certificate. The method 300 may further include matching, by the service gateway node, the first hash value associated with the server and the second hash value associated with the server at operation 316. The method 300 may further include operation 318, at which the service gateway node may determine, based on the matching, whether the server security certificate is valid. The method 300 may further include operation 320, at which the client SSL node may establish the SSL communication session between the client and the server based on the determination that the server security certificate is valid.

In an example embodiment, the client SSL node may terminate the SSL communication session between the client and the server based on the determination that the server security certificate is not valid.

In an example embodiment, the method 300 may further include querying, by service gateway node, a storage node to obtain the hash code associated with the server from the storage node. The querying may be performed based on the server address. The hash code may be stored in the storage node by the service gateway node during at least one previous SSL communication session between the client and the server and so forth.

In a further example embodiment, the method 300 may further include forging, by the client SSL node, the server security certificate to provide a forged server security certificate. The client SSL node may provide the forged server security certificate to the client to establish a secure connection between the client and the client SSL node based on the forged server security certificate. A secure connection between the client SSL node and the server may be established based on the server security certificate.

In one example embodiment, the method 300 may further include determining, by the service gateway node, that the hash code includes a plurality of hash codes associated with one or more further server security certificates. Each of the plurality of hash codes may include a first further hash value. The service gateway node may determine that the server security certificate is associated with the one or more further server security certificates. The one or more further server security certificates may be previously stored in the storage node during at least one previous SSL communication session between the client and the server. The method 300 may further include determining, by the service gateway node, a plurality of further second hash values. Each further second hash value may be associated with one of the one or more further server security certificates. The method 300 may further include determining, by the service gateway node, that at least one of the plurality of further second hash values matches the first further hash value to determine whether the server security certificate is valid.

Figure 4:
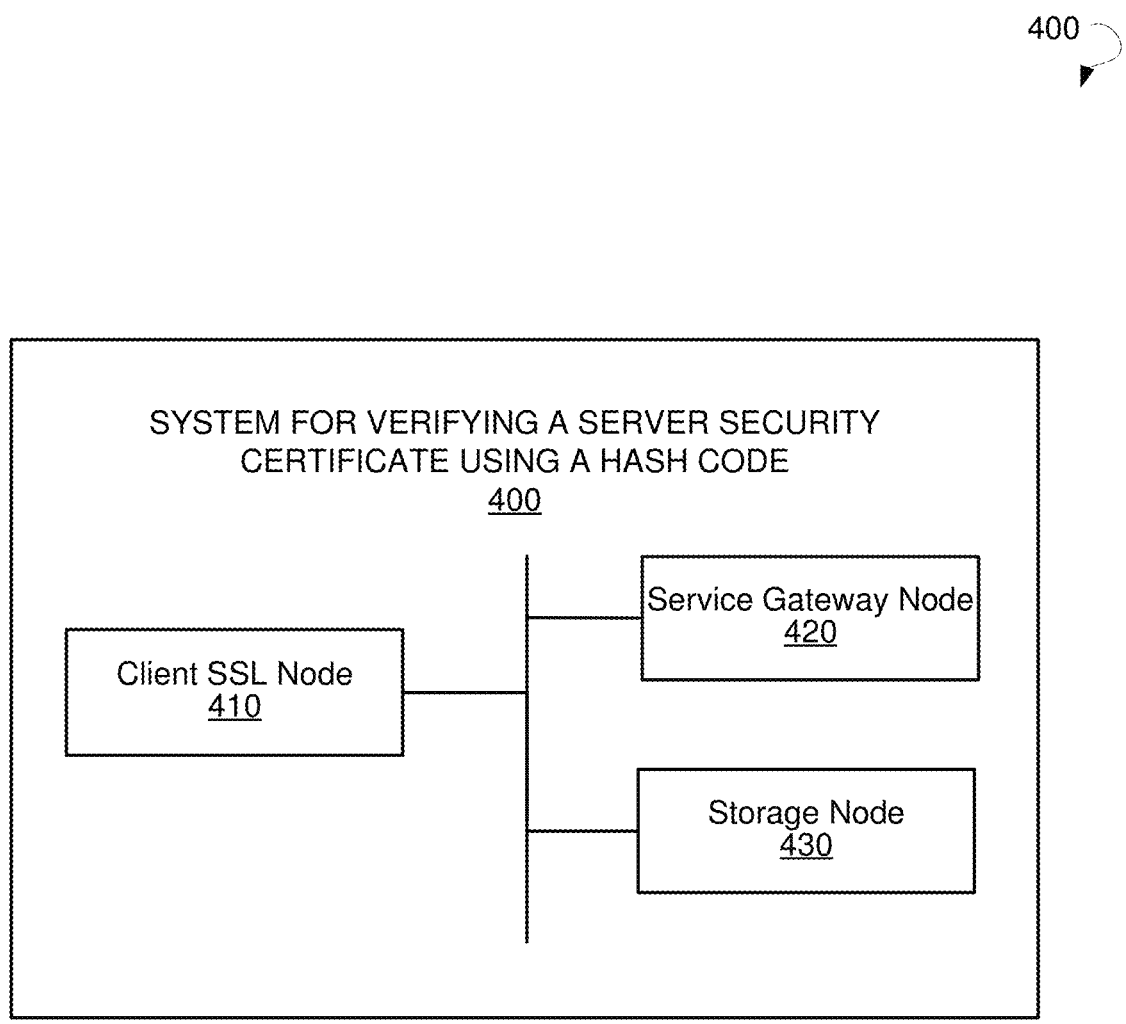
FIG. 4 is a block diagram of a system for validating a server security certificate using a hash code.

FIG. 4 shows a block diagram illustrating various modules of a system 400 for verifying a server security certificate using a hash code, according to an example embodiment. Specifically, the system 400 may include a client SSL node 410, a service gateway node 420 in communication with the client SSL node 410, and a storage node 430.

The client SSL node 410 may be operable to receive, from a client, a session request to establish an SSL communication session with the server. In an example embodiment, the client may include a plurality of modules including at least a network application, an SSL module, a client DNS module, and so forth. The session request may include at least a server address. The client SSL node 410 may forward the session request to the service gateway node 420. In an example embodiment, the SSL communication session may include a secure session selected from a group comprising: an HTTP session, a file transfer session, a remote access session, an FTP session, a voice over IP session, a SIP session, a video streaming session, an audio streaming session, an e-commerce session, an enterprise application session, an email session, an online gaming session, a teleconference session, and a web-based communication session.

The service gateway node 420 may be operable to send the session request to the server using the server address. The service gateway node 420 may be further operable to receive, in response to the session request, the server security certificate from the server. The service gateway node 420 may query a server DNS module associated with the server to receive the hash code associated with the server. The query may include sending at least the server address to the server DNS module. The service gateway node 420 may be operable to receive, in response to the querying, the hash code associated with the server from the server DNS module. In an example embodiment, the hash code may be selected from a group including: an integer, a hexa-decimal number, a string of characters, and so forth. The hash code may include at least a first hash value associated with the server and a hash function to be applied to the first hash value to obtain the server security certificate. The service gateway node 420 may be further operable to calculate a second hash value associated with the server by applying the hash function to the server security certificate. The service gateway node 420 may match the first hash value associated with the server and the second hash value associated with the server. Based on the matching, the service gateway node 420 may determine whether the server security certificate is valid. In one example embodiment, the hash function may be selected from a group comprising: a MD5 algorithm, a 16-bit CRC, a 32-bit CRC, a 64-bit CRC, a SHA Version 1, a SHA Version 2, SHA-512, and so forth. The client SSL node 410 may be further operable to establish the SSL communication session between the client and the server based on determining that the server security certificate is valid. In a further example embodiment, the client SSL node 410 may be further operable to terminate the SSL communication session between the client and the server based on the determination that the server security certificate is not valid.

In an example embodiment, the service gateway node 420 may be further operable to query the storage node 430 to obtain, based on the server address, the hash code associated with the server. The storage node 430 may be operable to store at least the server security certificate and the hash code associated with the server. The hash code may be stored in the storage node 430 during at least one previous SSL communication session between the client and the server.

In a further example embodiment, the client SSL node 410 may be further operable to forge the server security certificate to provide a forged server security certificate. Furthermore, the client SSL node 410 may be operable to provide the forged server security certificate to the client to establish a secure connection between the client and the service gateway node 420 based on the forged server security certificate. The client SSL node 410 may be further operable to establish a secure connection between the service gateway node 420 and the server based on the server security certificate.

In an example embodiment, the client SSL node 410 may be further operable to query the storage node 430 to obtain a forged server security certificate for the server security certificate. The forged server security certificate may be stored in the storage node 430 during at least one previous SSL communication session between the client and the server. The client SSL node 410 may be further operable to provide the forged server security certificate to the client to establish a secure connection between the client and the client SSL node 410 based on the forged server security certificate. The client SSL node 410 may be further operable to establish a secure connection between the client SSL node 410 and the server based on the server security certificate.

In one example embodiment, the service gateway node 420 may be further operable to determine that the hash code includes a plurality of hash codes associated with one or more further server security certificates. Each of the plurality of hash codes may include a first further hash value. The service gateway node 420 may be further operable to determine that the server security certificate is associated with the one or more further server security certificates. The one or more further server security certificates may be previously stored in the storage node 430 during at least one previous SSL communication session between the client and the server. The service gateway node 420 may be further operable to determine a plurality of further second hash values. Each further second hash value can be associated with one of the one or more further server security certificates. The service gateway node 420 may be further operable to determine that at least one of the plurality of further second hash values matches the first further hash value to determine whether the server security certificate is valid.

Figure 5:
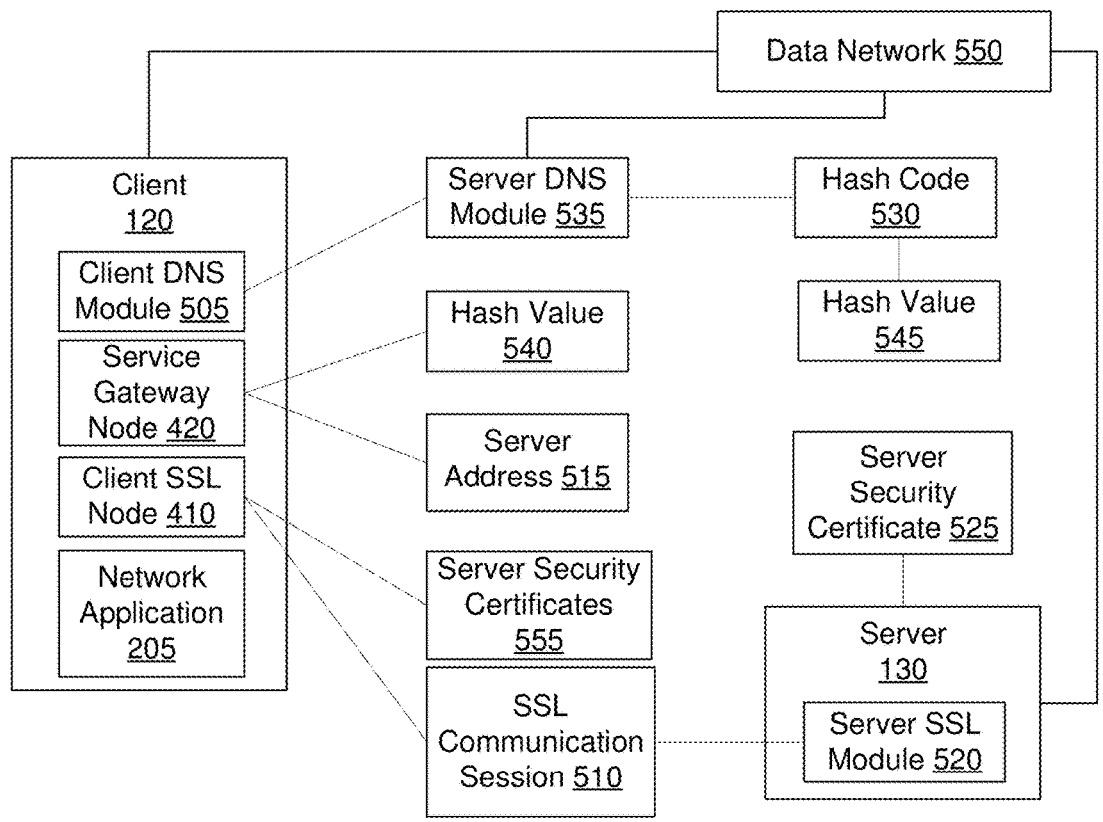
FIG. 5 is a block diagram illustrating establishment of a communication session between a client and a server based on verification of a server security certificate.

FIG. 5 is a block diagram 500 illustrating verification of a server security certificate using a hash code, according to an example embodiment. A client device shown as a client 120 may include a plurality of software modules, such as a network application 205, a client DNS module 505, and components of the system 400 for verifying a server security certificate using a hash code, such as a client SSL node 410 and a service gateway node 420. In an example embodiment, the network application 205 may provide a session request to the client SSL node 410 to establish an SSL communication session 510 with a server 130 using a server address 515.

In an example embodiment, the SSL communication session 510 may include a secure session to support a communication session, such as an HTTP session, a file transfer session, a remote access session, a FTP session, a voice over IP session, a SIP session, a video or audio streaming session, an e-commerce session, an enterprise application session, an email session, an online gaming session, a teleconference session, a Web-based communication session, and the like.

In an example embodiment, the network application 205 may send a server name indication (SNI) to the client SSL node 410 while establishing the SSL communication session 510. The client SSL node 410 may use the SNI for determining the server address 515. In a further example embodiment, the network application 205 may provide the server address 515 to the client SSL node 410 separately. The server address 515 may include a domain name associated with the server 130. More specifically, the server address 515 may include a domain name matching the server 130, or a Uniform Resource Locator used in an HTTP session over the SSL communication session 510.

The client SSL node 410 may send the session request to a server SSL node 520 associated with the server 130. In response to the receipt of the session request, the server SSL node 520 may send a server security certificate 525 to the client SSL node 410. In an example embodiment, the server security certificate 525 may be a security certificate selected from a group including: an Internet security certificate, an SSL certificate, a CA certificate, a corporate issued security certificate, a network generated security certificate, a trusted security certificate, a user certificate, or any digital security certificate used between peers of a secure data communication session. In one embodiment, the server security certificate 525 may include one or more of a digital signature, a key for encryption and decryption, and an indication related to a cipher method.

The client SSL node 410 may verify the server security certificate 525. More specifically, the client SSL node 410 may send a request to the client DNS module 505 to obtain a hash code 530 for the server address 515. In an example embodiment, the client DNS module 505 may send the server address 515 to a server DNS module 535 and receive the hash code 530 from a server DNS module 740. The hash code 530 may include a hash value 545 associated with the server 130. Moreover, the hash code 530 may include a hashing method or a hash function, such as MD5, CRC-32, SHA, or any other hash function. The hash value 545 provided in the hash code 530 may include a value selected from a group comprising: an integer, a hexa-decimal number, a string of characters, or a value indicating a result of applying the hash function to the server security certificate.

In an example embodiment, the client SSL node 410 may receive the hash code 530 from the client DNS module 505. The client SSL node 410 may calculate a hash value 540 based on a hash function included in the hash code 530. More specifically, the client SSL node 410 may calculate the hash value 540 using the server security certificate 525 according to the instruction present in the hash code 530. The instruction present in the hash code 530 may include a hash function. In a further example embodiment, the client SSL node 410 may calculate the hash value 540 using the server security certificate 525 and additional server security certificates related to server security certificate 525, according to the hash code 530. The additional server security certificates may be retrieved from a storage node (not shown). Upon calculation of the hash value 540, the client SSL node 410 may compare the hash value 540 to the hash value 545 included in the hash code 530. The client SSL node 410 may determine that the hash value 540 matches the hash value 545 and, thus, determine that the server security certificate 525 is valid. The client SSL node 410 may continue establishing the SSL communication session 510 with the server 130.

In a further example embodiment, the client SSL node 410 may determine that the hash value 540 does not match the hash value 545. Based on such determination, the client SSL node 410 may determine that the server security certificate 525 is not valid. The client SSL node 410 may inform the network application 205 of a verification error associated with the server 130, the server address 515, or the server security certificate 525. Moreover, the client SSL node 410 may terminate the SSL communication session 510.

In some example embodiments, the client DNS module 505 may obtain the hash code 530 from the server DNS module 535 prior to being requested by the client SSL node 410 for the SSL communication session 510. The client DNS module 505 may send the hash code 530 to the client SSL node 410. The client SSL node 410 may obtain the hash code 530 during a previous establishment of SSL communication sessions between the client 120 and the server 130. Therefore, the client SSL node 410 may use the hash code 530 to verify the server security certificate 525, without interacting with the client DNS module 505. The client SSL node 410 may determine that the server security certificate 525 received from the server 130 over the SSL communication session 510 matches a previously stored server security certificate and that the server security certificate 525 was previous verified. The client SSL node 410 may determine that the server security certificate 525 is verified for the SSL communication session 510.

In a further example embodiment, the hash code 530 may include one or more hash codes for one or more server security certificates 555 related to the server security certificate 525. The client SSL node 410 may determine that the server security certificate 525 is related to a plurality of previously stored server security certificates 555 and apply the hash function present in the hash code 530 to the server security certificates 555. In some example embodiments, the server security certificates 555 may include a chain of certificates and the server security certificate 525 may be a part of the chain of certificates. In a further example embodiment, the server security certificates 555 may include a root certificate for the server security certificate 525. In an example embodiment, the root certificate may be an unsigned or a self-signed public key certificate that identifies a root CA.

In an example embodiment, the hash code 530 may include a plurality of hash codes. For example, the hash code 530 may include ((<hashing method-1>, <hash value-1>), (<hashing method-2>, <hash value-2>) . . . ) to indicate one or more hash codes. The client SSL node 410 may apply the hash function present in each of the hash codes of the hash code 530 to the server security certificate 525 and/or the server security certificates 555, and determine if the calculated hash values match the hash value present in the hash codes of the hash code 530. The client SSL node 410 may determine that server security certificate 525 is verified when at least one calculated hash value matches the hash value of at least one hash code of the hash code 530. In another example embodiment, the client SSL node 410 may determine that the server security certificate 525 is verified when all hash values of the hash codes of the hash code 530 match the calculated hash values.

Figure 6:
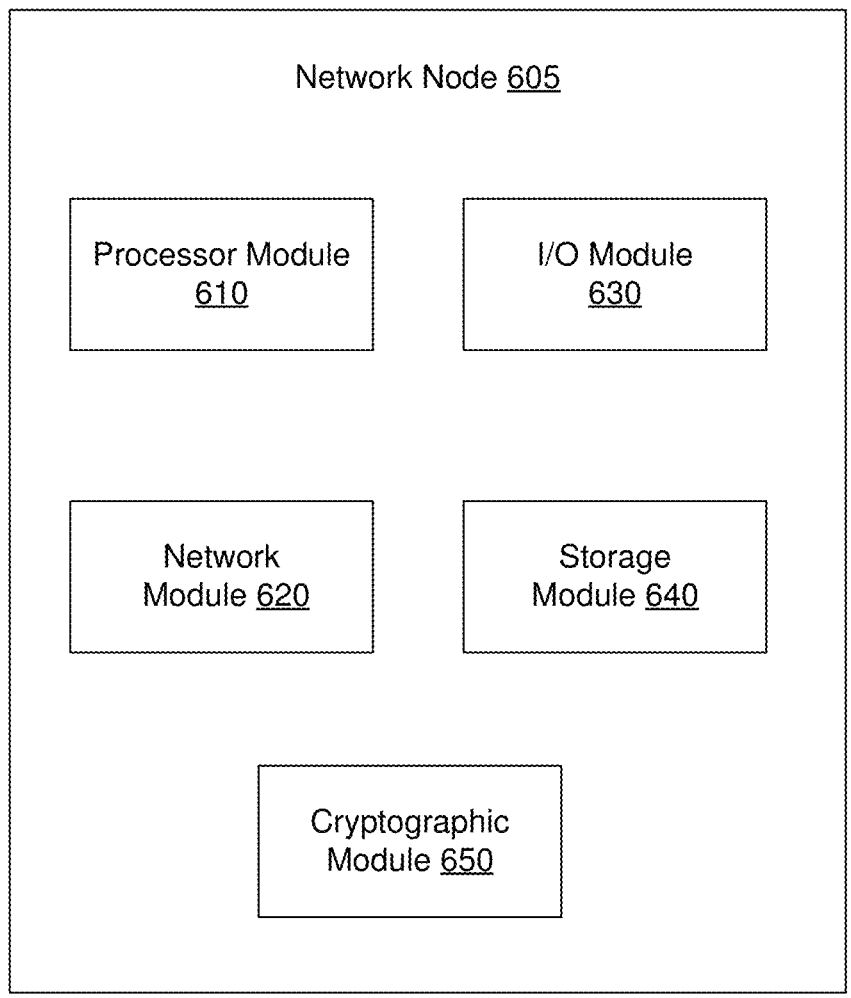
FIG. 6 is a block diagram illustrating components of a network node.

FIG. 6 is a block diagram 600 illustrating a network node, according to an example embodiment. A network node 605 may be configured in a form of a service gateway node, a client SSL node, a client, and a server. In an example embodiment, the network node 605 may include a processor module 610, a network module 620, an input/output (I/O) module 630, a storage module 640, and a cryptographic module 650. The processor module 610 may include one or more processors, such as a microprocessor, an Intel processor, an Advanced Micro Devices (AMD) processor, a microprocessor without interlocked pipeline stages, an advanced restricted instruction set computer (RISC) machine-based processor, or a RISC processor. In one embodiment, the processor module 610 may include one or more processor cores embedded in the processor module 610. In a further example embodiment, the processor module 610 may include one or more embedded processors, or embedded processing elements in a Field Programmable Gate Array, an ASIC, or a Digital Signal Processor. In an example embodiment, the network module 620 may include a network interface such as Ethernet, optical network interface, a wireless network interface, T1/T3 interface, a WAN interface or a LAN interface. In a further example embodiment, the network module 620 may include a network processor. The storage module 640 may include Random-access memory (RAM), Dynamic Random Access Memory, Static Random Access Memory, Double Data Rate Synchronous Dynamic Random Access Memory, or memory utilized by the processor module 610 or the network module 620. The storage module 640 may store data utilized by the processor module 610. In an example embodiment, the storage module 640 may include a hard disk drive, a solid state drive, an external disk, a Digital Versatile Disc (DVD), a compact disk (CD), or a readable external disk. The storage module 640 may store one or more computer programming instructions which when executed by the processor module 610 or the network module 620 implement one or more of the functionality of the methods and systems for providing a fault resilient virtual broadband gateway described herein. In an example embodiment, the I/O module 630 may include a keyboard, a keypad, a mouse, a gesture-based input sensor, a microphone, a physical or sensory input peripheral, a display, a speaker, or physical or sensual output peripheral. In an example embodiment, the cryptographic module 650 may include one or more hardware-based cryptographic computing modules.

Referring to FIG. 5, the client 120 may be configured in a form of the network node 605 illustrated in FIG. 6 and may be connected to a data network 550. The client 120 may include a PC, a laptop computer, a tablet, a smartphone, a mobile phone, an Internet phone, a netbook, a home gateway, a broadband gateway, a network appliance, a set top box, a media server, a personal media player, an access gateway, a networking switch, a server computer, a network storage computer, and any computing device comprising at least a network module and a processor module.

In a further example embodiment, the server 130 may be configured in a form of the network node 605 illustrated in FIG. 6 and may be connected to the data network 550. The data network 550 may include an Ethernet network, an ATM network, a cellular network, a wireless network, a Frame Relay network, an optical network, an IP network or any data communication network utilizing other physical layer, link layer capability or network layer to carry data packets.

In an example embodiment, the client SSL node 410 and the server SSL node 520 may include a plurality of programming instructions, which when executed by a plurality of processors may exchange packets according to an SSL protocol. The client SSL node 410 and the server SSL node 520 may use a hardware-based cryptographic module to process data encryption and decryption.

Figure 7:
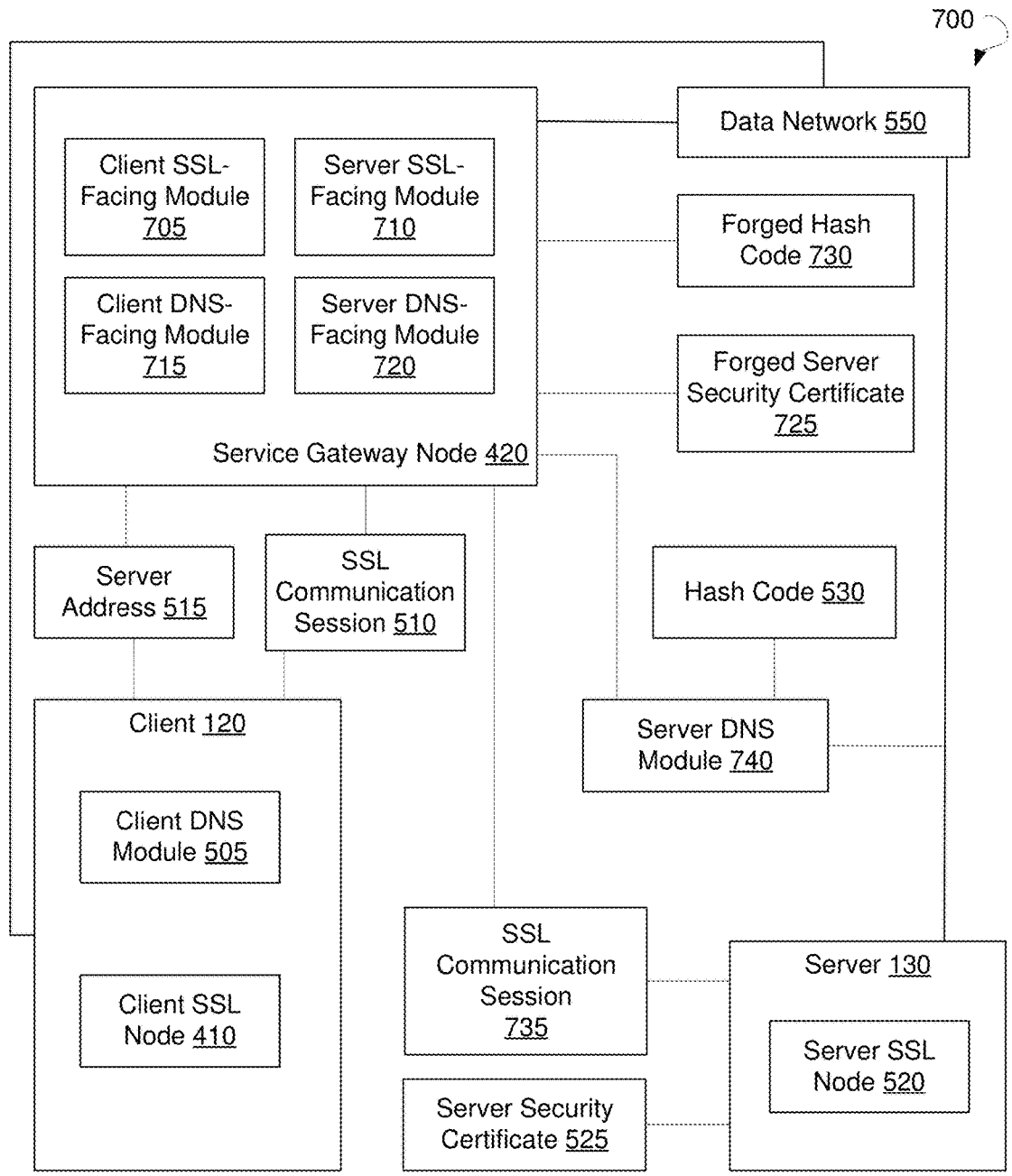
FIG. 7 is a block diagram illustrating verification of server security certificates and forging the server security certificates via a system for verifying a server security certificate using a hash code.

FIG. 7 is a block diagram 700 illustrating verification of a server security certificate and forging the server security certificate via a system for verifying a server security certificate using a hash code, according to an example embodiment. The client SSL node 410 of the client 120 may send a session request to establish an SSL communication session 510 using a server address 515. In one embodiment, the service gateway node 420 of the system for verifying a server security certificate using a hash code may include a client SSL-facing module 705, a server SSL-facing module 710, a client DNS-facing module 715, and a server DNS-facing module 720.

The client SSL-facing module 705 of the service gateway node 420 may receive the session request and obtain the server address 515 from the session request. The service gateway node 420 may match the server address 515 to server security certificates stored in a storage node (not shown) and retrieve a forged server security certificate 725 that matches the server address 515. The client SSL-facing module 705 of the service gateway node 420 may respond to the client SSL node 410 by sending the forged server security certificate 725. The client SSL node 410 may proceed with verifying the forged server security certificate 725 according to a process shown on FIG. 5.

In an example embodiment, the forged server security certificate 725 may include a security certificate, such as an Internet security certificate, an SSL certificate, a CA certificate, a corporate issued security certificate, a network generated security certificate, a trusted security certificate, a user certificate, or any digital security certificate used between peers of a secure data communication session. In an example embodiment, the forged server security certificate 725 may be not digitally signed by a trusted CA. The forged server security certificate 725 may be generated by the service gateway node 420. Furthermore, the forged server security certificate 725 may be digitally signed by the service gateway node 420.

The client DNS module 505 of the client 120 may send a DNS request to the server DNS-facing module 720. The server DNS-facing module 720 of the service gateway node 420 may receive the DNS request and obtain the server address 515 from the DNS request. The server DNS-facing module 720 may match the server address 515 to hash codes stored in the storage node, retrieve a forged hash code 730 that matches the server address 515, and respond to the client DNS module 505 by sending the forged hash code 730. Upon receiving the forged hash code 730 by the client DNS module 505, the client DNS module 505 may send the forged hash code 730 to the client SSL node 410. The client SSL node 410 may proceed with verifying the forged server security certificate 725 based on the forged hash code 730.

In one embodiment, the forged hash code 730 is a hash code associated with the server 130 and may include at least a hash function and a hash value representing a result of applying the hash function to the server security certificate.

In an example embodiment, the service gateway node 420, while establishing the SSL communication session 510 with the client 120 via the client SSL node 410, may send a request to establish an SSL communication session 735, via the server SSL-facing module 710, with the server 130 using server address 515. The server SSL node 520 of the server 130 may receive the request to establish the SSL communication session 735 and send the server security certificate 525 to the server SSL-facing module 710. The server SSL-facing module 710 may verify the server security certificate 525. More specifically, the server SSL-facing module 710 may request the client DNS-facing module 715 of the service gateway node 420 to obtain the hash code 530 for the server address 515. The client DNS-facing module 715 may send a request to the server DNS module 740 using the server address 515. The server DNS module 740 may respond by sending the hash code 530. The client DNS-facing module 715 may receive the hash code 530 from the server DNS module 740 and send the hash code 530 to the server SSL-facing module 710. The server SSL-facing module 710 may apply the hash function present in the hash code 530 to calculate a hash value for the server security certificate 525 and match the calculated hash value to the hash value of the hash code 530. Based on the matching, the server SSL-facing module 710 may determine that the server security certificate 525 is valid. The server SSL-facing module 710 may continue establishing the SSL communication session 735. The server SSL-facing module 710 may inform the client SSL-facing module 705 to continue establishing the SSL communication session 510 with the client 120. In a further example embodiment, the server SSL-facing module 710 may determine that the hash value does not match the hash value present in the hash code 530 and that the server security certificate 525 is not valid. In this example embodiment, the server SSL-facing module 710 may terminate the SSL communication session 735. Moreover, the server SSL-facing module 710 may inform the client SSL-facing module 705 that the server security certificate 525 is not valid. The client SSL-facing module 705 may terminate the SSL communication session 510.

In an example embodiment, the client SSL node 410 may not verify the forged server security certificate 725 and the client DNS module 505 may not send a request for the forged hash code 730. The service gateway node 420 may determine to verify the server security certificate 525. More specifically, the service gateway node 420, may determine according to a pre-determined criteria, if it is necessary to verify the server security certificate 525.

In an example embodiment, the service gateway node 420 may verify the server security certificate 525 according to a previous establishment of SSL communication sessions for the server address 515, and may not need to verify the server security certificate 525 for the SSL communication session 735. The service gateway node 420 may obtain and store the hash code 530 prior to establishing the SSL communication session 735. The server SSL-facing module 710 may use the stored hash code 530 to verify the server security certificate 525.

In an example embodiment, the service gateway node 420 is a network node 605 as illustrated in FIG. 6. The service gateway node 420 may include one or more of the functionality of a firewall, an SSL proxy gateway, a server load balancer, an application delivery controller, a threat protection system, a secure traffic manager, a legal interception gateway, a VPN gateway, a transmission control protocol proxy gateway, and so forth. In a further example embodiment, the service gateway node 420 may include a hardware-based cryptographic module. Moreover, the service gateway node 420 may include a security system including one or more network nodes and a data network. One of the network nodes may process the SSL communication session 510 with the client 120 and the other one of the network nodes may process the SSL communication session 735 with the server 130. Furthermore, the service gateway node 420 may include a security application to process secure session data of the SSL communication session 510 or the SSL communication session 735. The security application may be associated with virus detection, credit card fraud, document or identity theft, session recording, cyber-attack detection, company security policy processing, government security policy or compliant processing, and so forth.

Figure 8:
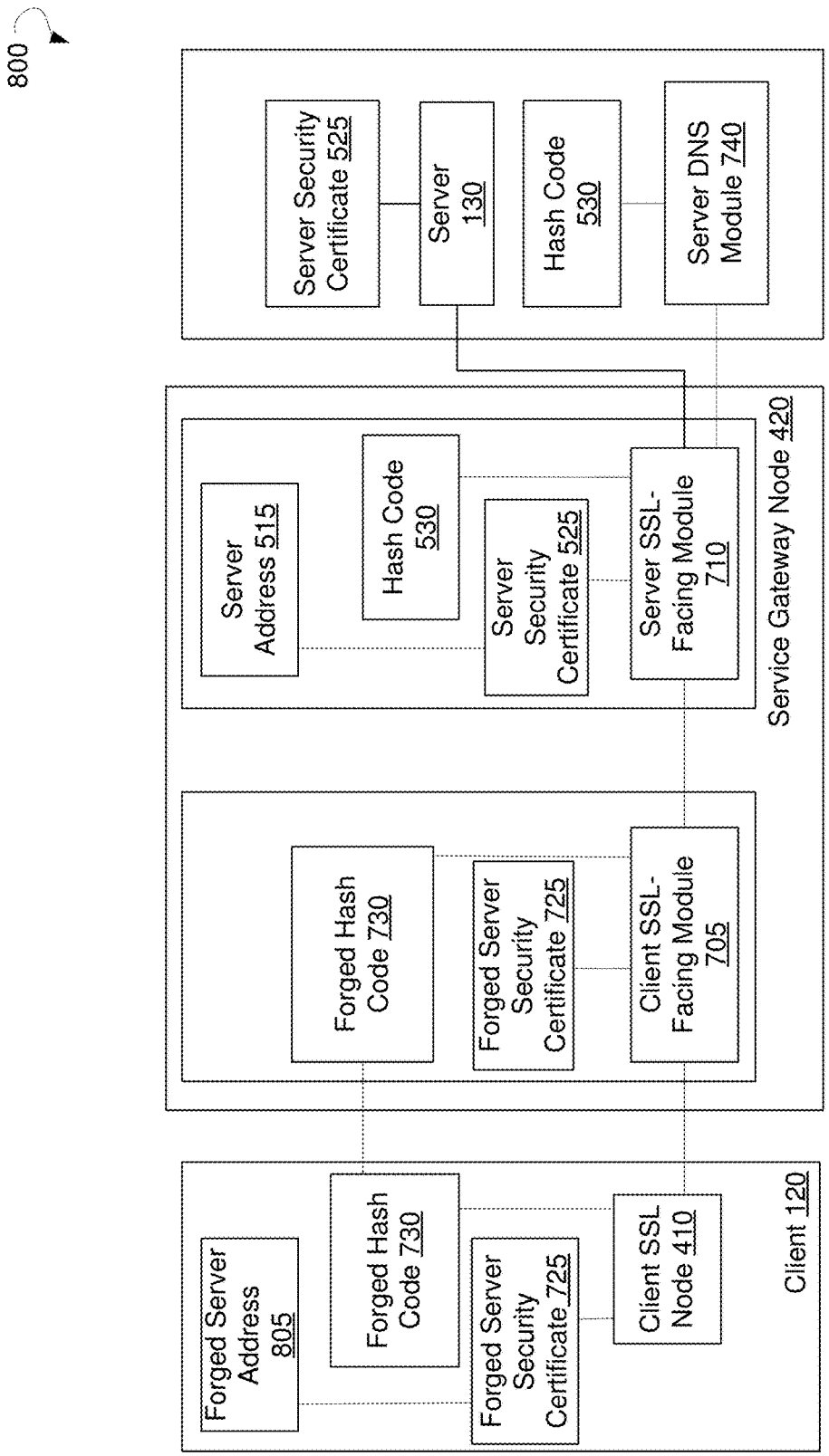
FIG. 8 is a block diagram showing verification of a server security certificate and forging the server security certificate by a service gateway node.

FIG. 8 is a block diagram 800 showing verification of a server security certificate and forging the server security certificate using a service gateway node, according to an example embodiment. The client SSL-facing module 705 of the service gateway node 420 may receive a session request from the client SSL node 410 associated with the client 120 to establish a secure communication session with the server 130. The client SSL-facing module 705 may instruct the server SSL-facing module 710 to communicate with the server 130, based on a server address 515 present in the session request, to obtain the server security certificate 525. In response to the request received from the server SSL-facing module 710, the server 130 may send the server security certificate 525 to the server SSL-facing module 710. To verify the server security certificate 525, the server SSL-facing module 710 may request the server DNS module 740 to provide a hash code 530 associated with the server 130. Based on the received hash code 530, the service gateway node 420 may verify the server security certificate 525 by applying a hash function present in the hash code 530 to the server security certificate 525. If the server security certificate 525 is valid, the service gateway node 420 may continue establishing the secure communication session between the client and the server 130.

When establishing the secure communication session, the service gateway node 420 may not provide the server security certificate 525 to the client SSL node 410. More specifically, the client SSL-facing module 705 of the service gateway node 420 may replace the server security certificate 525 with a forged server security certificate 725 and provide the forged server security certificate 725 to the client SSL node 410. The forged server security certificate 725 may include a forged server address 805. In an example embodiment, the forged server address 805 may include an address associated with the service gateway node 420.

Therefore, the service gateway node 420 may establish a secure connection between the client SSL node 410 and the client SSL-facing module 705 based on the forged server security certificate 725. Additionally, the service gateway node 420 may establish a secure connection between the server SSL-facing module 710 and the server 130 based on the server security certificate 525.

Additionally, the client SSL-facing module 705 may send the forged hash code 730 to the client SSL node 410. The client SSL node 410 may proceed with verifying the forged server security certificate 725 based on the forged hash code 730.

Figure 9:
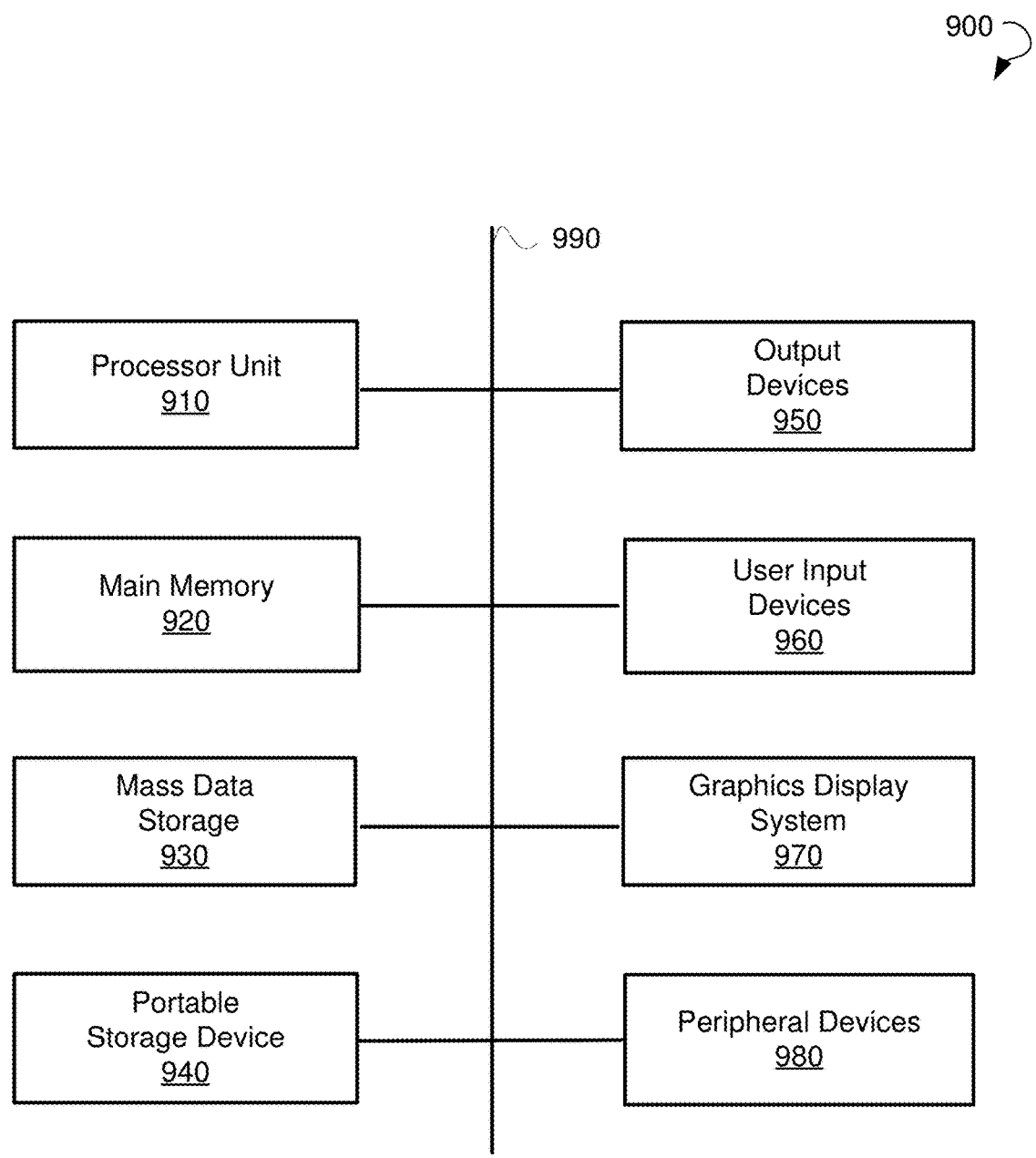
FIG. 9 shows a diagrammatic representation of a computing device for a machine, within which a set of instructions for causing the machine to perform any one or more of the methodologies discussed herein, can be executed.

FIG. 9 illustrates a computer system 900 that may be used to implement embodiments of the present disclosure, according to an example embodiment. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor units 910. Main memory 920 stores the executable code when in operation. The computer system 900 further includes a mass data storage 930, a portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor units 910 and main memory 920 are connected via a local microprocessor bus, and mass data storage 930, peripheral devices 980, the portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor units 910. Mass data storage 930 stores the system software for implementing embodiments of the present disclosure for purposes of loading that software into main memory 920.

The portable storage device 940 operates in conjunction with a portable non-volatile storage medium, such as a floppy disk, a CD, a DVD, or a USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 includes output devices 950. Suitable output devices 950 include speakers, printers, network interfaces, and monitors.

Graphics display system 970 includes a liquid crystal display or other suitable display device. Graphics display system 970 receives textual and graphical information and processes the information for output to the display device. Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 of FIG. 9 can be a PC, a hand held computing system, a telephone, a mobile computing system, a workstation, a tablet, a phablet, a mobile phone, a server, a minicomputer, a mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for verification of a server security certificate using a hash code are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for verifying a server security certificate using a hash code, the system comprising:
   a client secure socket layer (SSL) node operable to:
      receive, from a client, a session request to establish an SSL communication session with a server, the session request including at least a server address of the server;
      forward the session request to a service gateway node; and
      based on determining that the server security certificate is a valid server security certificate of the server, establish the SSL communication session between the client and the server;
   the service gateway node in communication with the client SSL node, the service gateway node being operable to:
      send the session request to the server using the server address;
      receive the server security certificate from the server, responsive to the session request;
      query a server domain name system (DNS) module associated with the server to receive the hash code associated with the server, wherein the querying includes sending at least the server address to the server DNS module;
      in response to the querying, receive the hash code associated with the server from the server DNS module, the hash code including at least a first hash value associated with the server and a hash function to be applied to the first hash value to obtain the valid server security certificate;
      calculate a second hash value associated with the server by applying the hash function to the server security certificate;
      match the first hash value associated with the server and the second hash value associated with the server; and
      based on the matching, determine whether the server security certificate is the valid server security certificate; and
   a storage node operable to store at least the server security certificate and the hash code associated with the server.

2. The system of claim 1, wherein the hash function is selected from a group comprising: a Message Digest 5 (MD5) algorithm, a 16-bit cyclic redundancy check (CRC), a 32-bit CRC, a 64-bit CRC, a Secure Hash Algorithm (SHA) Version 1, a SHA Version 2, and SHA-512.

3. The system of claim 1, wherein the client includes a plurality of modules including at least a network application, an SSL module, and a client DNS module.

4. The system of claim 1, wherein the client SSL node is further operable to:
   based on the determination that the server security certificate is not the valid server security certificate, terminate the SSL communication session between the client and the server.

5. The system of claim 1, wherein the service gateway node is further operable to:
   based on the server address, query the storage node to obtain the hash code associated with the server from the storage node, the hash code being stored in the storage node during at least one previous SSL communication session between the client and the server.

6. The system of claim 1, wherein the SSL communication session includes a secure session selected from a group comprising: a Hypertext Transfer Protocol (HTTP) session, a file transfer session, a remote access session, a File Transfer Protocol (FTP) session, a voice over Internet Protocol (VoIP) session, a Session Initiation Protocol (SIP) session, a video streaming session, an audio streaming session, an e-commerce session, an enterprise application session, an email session, an online gaming session, a teleconference session, and a web-based communication session.

7. The system of claim 1, wherein the client SSL node is further operable to:
 forge the server security certificate to provide a forged server security certificate; and
 provide the forged server security certificate to the client to establish a secure connection between the client and the service gateway node based on the forged server security certificate and to establish a secure connection between the service gateway node and the server based on the server security certificate.

8. The system of claim 1, wherein the client SSL node is further operable to:
 query the storage node to obtain a forged server security certificate for the server security certificate, the forged server security certificate being stored in the storage node during at least one previous SSL communication session between the client and the server; and
 provide the forged server security certificate to the client to establish a secure connection between the client and the client SSL node based on the forged server security certificate and to establish a secure connection between the client SSL node and the server based on the server security certificate.

9. The system of claim 1, wherein the hash code is selected from a group comprising:
 an integer, a hexa-decimal number, and a string of characters.

10. The system of claim 1, wherein the service gateway node is further operable to:
 determine that the hash code includes a plurality of hash codes associated with one or more further server security certificates, each of the plurality of hash codes comprising a first further hash value;
 determine that the server security certificate is associated with the one or more further server security certificates, the one or more further server security certificates being previously stored in the storage node during at least one previous SSL communication session between the client and the server;
 determine a plurality of further second hash values, each further second hash value being associated with one of the one or more further server security certificates; and
 determine that at least one of the plurality of further second hash values matches the first further hash value to determine whether the server security certificate is valid.

11. A method for verifying a server security certificate using a hash code, the method comprising:
 receiving, by a client secure sockets layer (SSL) node, from a client, a session request to establish an SSL communication session with a server, the session request including at least a server address of the server;
 forwarding, by the client SSL node, the session request to a service gateway node;
 sending, by the service gateway node, the session request to the server based on the server address;
 receiving, by the service gateway node, the server security certificate from the server responsive to the session request;
 querying, by the service gateway node, a server domain name system (DNS) module associated with the server to receive the hash code associated with the server, wherein the querying includes sending at least the server address to the server DNS module;
 in response to the querying, receiving, by the service gateway node, the hash code associated with the server from the server DNS module, the hash code including at least a first hash value associated with the server and a hash function to be applied to the first hash value to obtain a valid server security certificate of the server;
 calculating, by the service gateway node, a second hash value associated with the server by applying the hash function to the server security certificate;
 matching, by the service gateway node, the first hash value associated with the server and the second hash value associated with the server;
 based on the matching, determining, by the service gateway node, whether the server security certificate is the valid server security certificate; and
 based on the determination that the server security certificate is the valid server security certificate, establishing, by the client SSL node, the SSL communication session between the client and the server.

12. The method of claim 11, wherein the hash function is selected from a group comprising: a Message Digest 5 (MD5) algorithm, a 16-bit cyclic redundancy check (CRC), a 32-bit CRC, a 64-bit CRC, a Secure Hash Algorithm (SHA) Version 1, a SHA Version 2, and SHA 512.

13. The method of claim 11, wherein the client includes a plurality of modules including at least a network application, an SSL module, and a client DNS module.

14. The method of claim 11, further comprising:
 based on the determination that the server security certificate is not the valid server security certificate, terminating, by the client SSL node, the SSL communication session between the client and the server.

15. The method of claim 11, further comprising:
 based on the server address, querying, by the service gateway node, a storage node to obtain the hash code associated with the server from the storage node, the hash code being stored in the storage node by the service gateway node during at least one previous SSL communication session between the client and the server.

16. The method of claim 11, wherein the SSL communication session includes a secure session selected from a group comprising: a Hypertext Transfer Protocol (HTTP) session, a file transfer session, a remote access session, a File Transfer Protocol (FTP) session, a voice over Internet Protocol (VoIP) session, a Session Initiation Protocol (SIP) session, a video streaming session, an audio streaming session, an e-commerce session, an enterprise application session, an email session, an online gaming session, a teleconference session, and a web-based communication session.

17. The method of claim 11, further comprising:
 forging, by the client SSL node, the server security certificate to provide a forged server security certificate; and
 providing, by the client SSL node, the forged server security certificate to the client to establish a secure connection between the client and the client SSL node based on the forged server security certificate and to establish a secure connection between the client SSL node and the server based on the server security certificate.

18. The method of claim 11, further comprising:
querying, by the client SSL node, a storage node to obtain a forged server security certificate for the server security certificate, the forged server security certificate being stored in the storage node by the client SSL node during at least one previous SSL communication session between the client and the server; and
providing, by the client SSL node, the forged server security certificate to the client to establish a secure connection between the client and the client SSL node based on the forged server security certificate and to establish a secure connection between the client SSL node and the server based on the server security certificate.

19. The method of claim 11, further comprising:
determining, by the service gateway node, that the hash code includes a plurality of hash codes associated with one or more further server security certificates, each of the plurality of hash codes comprising a first further hash value;
determining, by the service gateway node, that the server security certificate is associated with the one or more further server security certificates, the one or more further server security certificates being previously stored in a storage node during at least one previous SSL communication session between the client and the server;
determining, by the service gateway node, a plurality of further second hash values, each further second hash value being associated with one of the one or more further server security certificates; and
determining, by the service gateway node, that at least one of the plurality of further second hash values matches the first further hash value to determine whether the server security certificate is valid.

20. A system for verifying a server security certificate using a hash code, the system comprising:
a client secure socket layer (SSL) node operable to:
receive, from a client, a session request to establish an SSL communication session with a server, the session request including at least a server address of the server;
forward the session request to a service gateway node;
based on determining that the server security certificate is a valid server security certificate of the server, establish the SSL communication session between the client and the server;
based on determining that the server security certificate is not the valid server security certificate, terminate the SSL communication session between the client and the server;
query a storage node to obtain a forged server security certificate for the server security certificate, the forged server security certificate being stored in the storage node during at least one previous SSL communication session between the client and the server; and
provide the forged server security certificate to the client to establish a secure connection between the client and the client SSL node based on the forged server security certificate and to establish a secure connection between the client SSL node and the server based on the server security certificate;
the service gateway node in communication with the client SSL node, the service gateway node being operable to:
send the session request to the server based on the server address;
receive the server security certificate from the server responsive to the session request;
query a server domain name system (DNS) module associated with the server to receive the hash code associated with the server, wherein the querying includes sending at least the server address to the server DNS module;
in response to the querying, receive the hash code associated with the server from the server DNS module, the hash code including at least a first hash value associated with the server and a hash function to be applied to the first hash value to obtain the valid server security certificate;
calculate a second hash value associated with the server by applying the hash function to the server security certificate, wherein the hash function is selected from a group comprising: a Message Digest 5 (MD5) algorithm, a 16-bit cyclic redundancy check (CRC), a 32-bit CRC, a 64-bit CRC, a Secure Hash Algorithm (SHA) Version 1, a SHA Version , and SHA-512;
match the first hash value associated with the server and the second hash value associated with the server; and
based on the matching, determine whether the server security certificate is the valid server security certificate; and
the storage node operable to store at least the server security certificate and the hash code associated with the server.

* * * * *